United States Patent
Montojo et al.

(10) Patent No.: US 8,379,536 B2
(45) Date of Patent: Feb. 19, 2013

(54) DOWNLINK CONTROL INFORMATION FOR EFFICIENT DECODING

(75) Inventors: Juan Montojo, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 310 days.

(21) Appl. No.: 12/900,331

(22) Filed: Oct. 7, 2010

(65) Prior Publication Data

US 2011/0085458 A1 Apr. 14, 2011

Related U.S. Application Data

(60) Provisional application No. 61/249,951, filed on Oct. 8, 2009.

(51) Int. Cl.
*H04W 4/00* (2009.01)
*H04Q 7/00* (2006.01)
*H04L 12/56* (2006.01)

(52) U.S. Cl. ........ 370/252; 370/329; 370/331; 375/260; 455/68; 455/434; 455/452.1

(58) Field of Classification Search .......... 370/252–281, 370/310–329, 331; 375/224, 260, 267, 295, 375/299, 316; 455/68, 91, 352, 434, 450, 455/452.1

See application file for complete search history.

(56) References Cited

U.S. PATENT DOCUMENTS

| | | | |
|---|---|---|---|
| 2010/0111107 A1* | 5/2010 | Han et al. | 370/472 |
| 2010/0195586 A1* | 8/2010 | Choi et al. | 370/329 |

OTHER PUBLICATIONS

"DRAFT3GPP TS 36.212 V8.7.0 (May 2009)", 3GPP Draft; DRAFT36212-870, 3rd Generation Partnership Project (3GPP), Mobile Competence Centre ; 650, Route Des Lucioles ; F-06921 Sophia-Antipolis Cedex; France, Jun. 2, 2009, XP050338735, [retrieved on Jun. 2, 2009] p. 43-p. 55.

International Search Report and Written Opinion—PCT/US2010/052095—ISA/EPO—Apr. 6, 2011.

Spreadtrum Communications: "Way t o reduce search space on PDCCH blind decoding", 3GPP Draft; R1-082030-Way to Reduce Search Space on PDCCH Blind Decoding, 3rd Generation Partnership Project (3GPP), Mobile Competence Centre ; 650, Route Des Lucioles ; F-06921 Sophia-Antipolis Cedex ; France, vol. RAN WG1, No. Kansas City, USA; 20080514, May 14, 2008, XP050110371, [retrieved on May 14, 2008].

* cited by examiner

*Primary Examiner* — Afsar Qureshi
(74) *Attorney, Agent, or Firm* — Steven A. Raney

(57) ABSTRACT

Certain aspects of the present disclosure present techniques for generating a downlink control information (DCI) message which may be transmitted with a particular organization of a downlink control channel and techniques for receiving the same. The DCI message may support uplink enhancements such as single-user multiple input multiple output (SU-MIMO) and clustered DFT-S-OFDM, and may limit blind decoding operations at a user equipment.

56 Claims, 11 Drawing Sheets

| | Common Search Space | Two Sizes | UE-Specific Search Space |
|---|---|---|---|
| Two Sizes | | | |
| 1A/0/3A | 1A:<br>• DL broadcast (SI/P/RA-RNTI) or,<br>• DL unicast (UE-specific RNTI) | 1A/0 | 1A: DL Unicast (UE-specific RNTI) |
| | 0: UL unicast (UE-specific RNTI) | | 0: UL unicast (UE-specific RNTI) |
| | 3/3A: Group power control (TPC-PUCCH/PUSCH-RNTI) | | |
| 1C | Broadcast (SI/P/RA-RNTI) | Mode-dependent (1/1B/1D/2/2A, etc) | DL Unicast (UE-specific RNTI) |

| Two Sizes | Common Search Space | Two Sizes | UE-Specific Search Space |
|---|---|---|---|
| 1A/0/4/3/3A | 1A:<br>• DL broadcast (SI/P/RA-RNTI)<br>or,<br>• DL unicast (UE-specific RNTI) | 1A/0/4 | 1A: DL Unicast (UE-specific RNTI) |
| | 0/4: UL unicast (UE-specific RNTI) | | 0/4: UL unicast (UE-specific RNTI) |
| | 3/3A: Group power control (TPC-PUCCH/PUSCH-RNTI) | | |
| 1C | Broadcast (SI/P/RA-RNTI) | Mode-dependent (1/1B/1D/2/2A, etc) | DL Unicast (UE-specific RNTI) |

FIG. 7

| Two Sizes | Common Search Space | Two Sizes | UE-Specific Search Space |
|---|---|---|---|
| 1A/0/3/3A | 1A:<br>• DL broadcast (SI/P/RA-RNTI)<br>or,<br>• DL unicast (UE-specific RNTI) | 1A'/0' / 4 | 1A': DL Unicast (UE-specific RNTI) |
|  | 0: UL unicast (UE-specific RNTI) |  | 0'/4: UL unicast (UE-specific RNTI) |
|  | 3/3A: Group power control (TPC-PUCCH/PUSCH-RNTI) |  |  |
| 1A'/0' / 4 | 1A': DL unicast (UE-specific RNTI)<br>0'/4: UL unicast (UE-specific RNTI) |  |  |
| 1C | Broadcast (SI/P/RA-RNTI) | Mode-dependent (1/1B/1D/2/2A, etc) | DL Unicast (UE-specific RNTI) |

FIG. 8

| Two Sizes | Common Search Space | Two Sizes | UE-Specific Search Space |
|---|---|---|---|
| 1A/3/3A | 1A: DL broadcast (SI/P/RA-RNTI) | [1A'/0'] / [4] | [1A'] : DL Unicast (UE-specific RNTI) |
| | 3/3A: Group power control (TPC-PUCCH/PUSCH-RNTI) | | [0'] / [4] : UL unicast (UE-specific RNTI) |
| [1A'/0'] / [4] | 1A': DL unicast (UE-specific RNTI)<br>0'/4: UL unicast (UE-specific RNTI) | | |
| 1C | Broadcast (SI/P/RA-RNTI) | Mode-dependent (1/1B/1D/2/2A, etc) | DL Unicast (UE-specific RNTI) |

FIG. 9

| | Common Search Space | Two Sizes | UE-Specific Search Space |
|---|---|---|---|
| Two Sizes 1A/0/3/3A | 1A:<br>• DL broadcast (SI/P/RA-RNTI) or,<br>• DL unicast (UE-specific RNTI) | 1A' / 0' / 4 | 1A': DL Unicast (UE-specific RNTI) |
| | 0: UL unicast (UE-specific RNTI) | | 0'/4 : UL unicast (UE-specific RNTI) |
| | 3/3A: Group power control (TPC-PUCCH/PUSCH-RNTI) | | |
| 1C | Broadcast (SI/P/RA-RNTI) | Mode-dependent (1/1B/1D/2/2A, etc) | DL Unicast (UE-specific RNTI) |

| | Common Search Space | Two Sizes | UE-Specific Search Space |
|---|---|---|---|
| Two Sizes | | | |
| 1A/0/3/3A | 1A:<br>• DL broadcast (SI/P/RA-RNTI)<br>or,<br>• DL unicast (UE-specific RNTI) | 1A:/4 | 1A: DL Unicast (UE-specific RNTI) |
| | 0: UL unicast (UE-specific RNTI) | | 4: UL unicast (UE-specific RNTI) |
| | 3/3A: Group power control (TPC-PUCCH/PUSCH-RNTI) | | |
| 1C | Broadcast (SI/P/RA-RNTI) | Mode-dependent (1/1B/1D/2/2A, etc) | DL Unicast (UE-specific RNTI) |

FIG. 11

DOWNLINK CONTROL INFORMATION FOR EFFICIENT DECODING

CLAIM OF PRIORITY UNDER 35 U.S.C. §119

The present Application for Patent claims priority to U.S. Provisional Application No. 61/249,951, entitled, "Downlink Control Information For Multiple Carrier Wireless Communication," filed Oct. 8, 2009, and assigned to the assignee hereof and expressly incorporated herein by reference.

BACKGROUND

1. Field

The present disclosure relates generally to communications and, more specifically, to utilizing downlink control information in a wireless network.

2. Background

The 3rd Generation Partnership Project (3GPP) Long Term Evolution (LTE) represents a major advance in cellular technology and is the next step forward in cellular 3G services as a natural evolution of Global System for Mobile Communications (GSM) and Universal Mobile Telecommunications System (UMTS). The LTE provides for an uplink speed of up to 75 megabits per second (Mbps) and a downlink speed of up to 300 Mbps and brings many technical benefits to cellular networks. The LTE is designed to meet carrier needs for high-speed data and media transport as well as high-capacity voice support well into this decade. Bandwidth is scalable from 1.25 MHz to 20 MHz. This suits the needs of different network operators that have different bandwidth allocations, and also allows operators to provide different services based on spectrum.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses Orthogonal Frequency Division Multiple Access (OFDMA) on the downlink (DL) and Single Carrier-Frequency Division Multiple Access (SC-FDMA) on the uplink (UL). OFDMA allows data to be directed to or from multiple users on a subcarrier-by-subcarrier basis for a specified number of symbol periods.

SUMMARY

Certain aspects of the present disclosure provide a method for wireless communications. The method generally includes determining a first size of first and second downlink control information (DCI) formats, wherein the first DCI format carries information about a first uplink operation in a single codeword and the second DCI format carries information about at least one downlink operation in a single codeword, determining a second size of a third DCI format carrying information about a second uplink operation in a single codeword, wherein a number of information bits in the third DCI format is larger than a number of information bits in the first DCI format, adjusting a size of the second DCI format to match the second size and to obtain a fourth DCI format, generating a DCI message using one of the first, second, third and fourth DCI formats, transmitting the DCI message, and receiving an uplink signal transmitted in response to the DCI message.

Certain aspects of the present disclosure provide a method for wireless communications. The method generally includes receiving a downlink control information (DCI) message, wherein the DCI message utilizes one of first, second, third and fourth DCI formats, the first and second formats utilizing a first size, wherein the first DCI format carries information about a first uplink operation in a single codeword, wherein the second DCI format carries information about at least one downlink operation in a single codeword, wherein the third DCI format, having a second size, carries information about a second uplink operation in a single codeword, wherein the fourth DCI format carries information similar to the second DCI format, size of the fourth DCI format is matched to the second size, and wherein a number of information bits in the third DCI format is larger than a number of information bits in the first DCI format, extracting the information in the DCI message, and transmitting an uplink signal using the extracted information.

Certain aspects of the present disclosure provide an apparatus for wireless communications. The apparatus generally includes means for determining a first size of first and second downlink control information (DCI) formats, wherein the first DCI format carries information about a first uplink operation in a single codeword and the second DCI format carries information about at least one downlink operation in a single codeword, means for determining a second size of a third DCI format carrying information about a second uplink operation in a single codeword, wherein a number of information bits in the third DCI format is larger than a number of information bits in the first DCI format, means for adjusting a size of the second DCI format to match the second size and to obtain a fourth DCI format, means for generating a DCI message using one of the first, second, third and fourth DCI formats, means for transmitting the DCI message, and means for receiving an uplink signal transmitted in response to the DCI message.

Certain aspects of the present disclosure provide an apparatus for wireless communications. The apparatus generally includes means for receiving a downlink control information (DCI) message, wherein the DCI message utilizes one of first, second, third and fourth DCI formats, the first and second formats utilizing a first size, wherein the first DCI format carries information about a first uplink operation in a single codeword, wherein the second DCI format carries information about at least one downlink operation in a single codeword, wherein the third DCI format, having a second size, carries information about a second uplink operation in a single codeword, wherein the fourth DCI format carries information similar to the second DCI format, size of the fourth DCI format is matched to the second size, and wherein a number of information bits in the third DCI format is larger than a number of information bits in the first DCI format, means for extracting the information in the DCI message, and means for transmitting an uplink signal using the extracted information.

Certain aspects of the present disclosure provide an apparatus for wireless communications. The apparatus generally includes at least one processor configured to determine a first size of first and second downlink control information (DCI) formats, wherein the first DCI format carries information about a first uplink operation in a single codeword and the second DCI format carries information about at least one downlink operation in a single codeword, determine a second size of a third DCI format carrying information about a second uplink operation in a single codeword, wherein a number of information bits in the third DCI format is larger than a number of information bits in the first DCI format, adjust a size of the second DCI format to match the second size and to obtain a fourth DCI format, generate a DCI message using one of the first, second, third and fourth DCI formats, transmit the DCI message, and receive an uplink signal transmitted in response to the DCI message, and a memory coupled to the at least one processor.

Certain aspects of the present disclosure provide an apparatus for wireless communications. The apparatus generally includes at least one processor configured to receive a downlink control information (DCI) message, wherein the DCI message utilizes one of first, second, third and fourth DCI formats, the first and second formats utilizing a first size, wherein the first DCI format carries information about a first uplink operation in a single codeword, wherein the second DCI format carries information about at least one downlink operation in a single codeword, wherein the third DCI format, having a second size, carries information about a second uplink operation in a single codeword, wherein the fourth DCI format carries information similar to the second DCI format, size of the fourth DCI format is matched to the second size, and wherein a number of information bits in the third DCI format is larger than a number of information bits in the first DCI format, extract the information in the DCI message, and transmit an uplink signal using the extracted information, and a memory coupled to the at least one processor.

Certain aspects provide a computer-program product for wireless communications, comprising a computer readable medium having instructions stored thereon, the instructions being executable by one or more processors. The instructions generally include instructions for determining a first size of first and second downlink control information (DCI) formats, wherein the first DCI format carries information about a first uplink operation in a single codeword and the second DCI format carries information about at least one downlink operation in a single codeword instructions for determining a second size of a third DCI format carrying information about a second uplink operation in a single codeword, wherein a number of information bits in the third DCI format is larger than a number of information bits in the first DCI format, instructions for adjusting a size of the second DCI format to match the second size and to obtain a fourth DCI format, instructions for generating a DCI message using one of the first, second, third and fourth DCI formats, instructions for transmitting the DCI message, and instructions for receiving an uplink signal transmitted in response to the DCI message.

Certain aspects provide a computer-program product for wireless communications, comprising a computer readable medium having instructions stored thereon, the instructions being executable by one or more processors. The instructions generally include instructions for receiving a downlink control information (DCI) message, wherein the DCI message utilizes one of first, second, third and fourth DCI formats, the first and second formats utilizing a first size, wherein the first DCI format carries information about a first uplink operation in a single codeword, wherein the second DCI format carries information about at least one downlink operation in a single codeword, wherein the third DCI format, having a second size, carries information about a second uplink operation in a single codeword, wherein the fourth DCI format carries information similar to the second DCI format, size of the fourth DCI format is matched to the second size, and wherein a number of information bits in the third DCI format is larger than a number of information bits in the first DCI format, instructions for extracting the information in the DCI message, and instructions for transmitting an uplink signal using the extracted information.

BRIEF DESCRIPTION OF THE DRAWINGS

FIG. 7 illustrates aspects of an example organization of a PDCCH and control information formats, in accordance with certain aspects of the present disclosure.

FIG. 8 illustrates a further example organization of a PDCCH and control information formats, in accordance with certain aspects of the present disclosure.

FIG. 9 illustrates another example organization of a PDCCH with control information formats, in accordance with certain aspects of the present disclosure.

FIG. 10 illustrates yet another example organization of a PDCCH with fourth control information formats, in accordance with certain aspects of the present disclosure.

FIG. 11 illustrates a further example organization of a PDCCH with control information formats, in accordance with certain aspects of the present disclosure.

DETAILED DESCRIPTION

Figure 1:
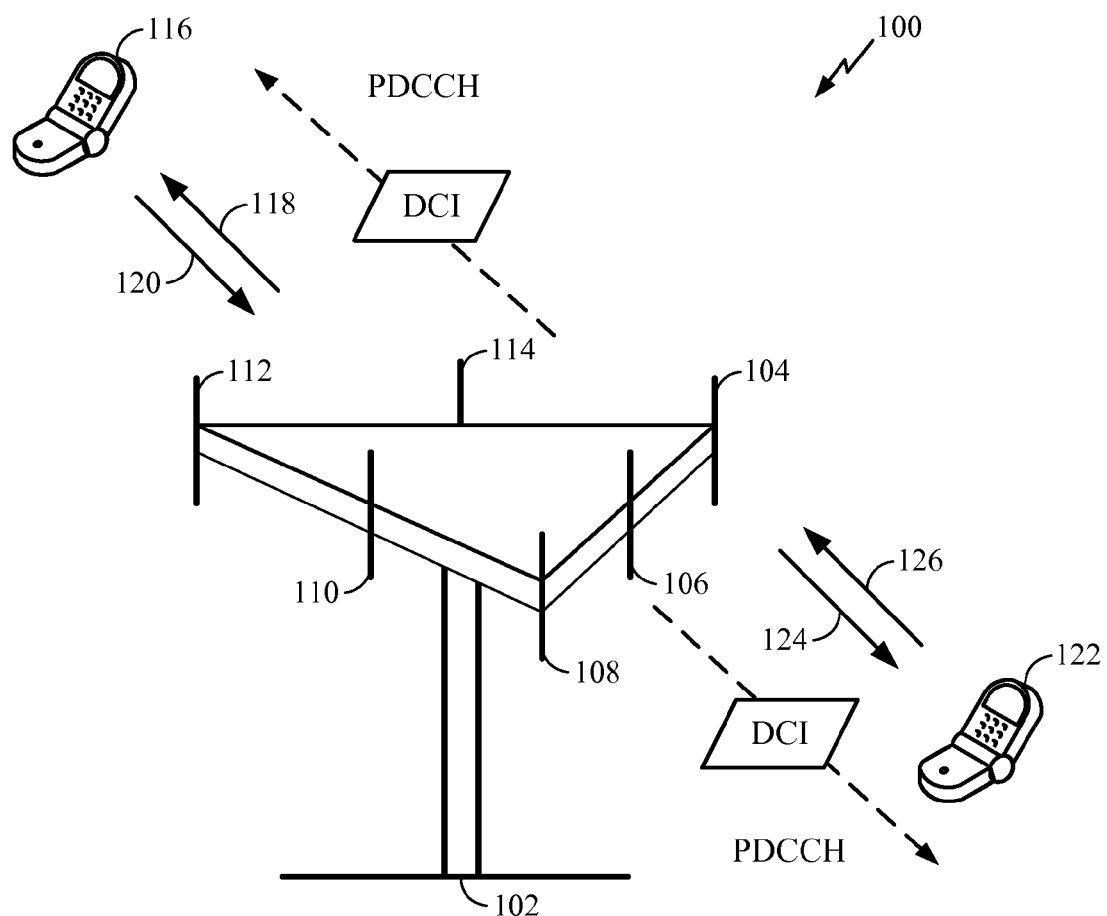
FIG. 1 illustrates a multiple access wireless communication system, in accordance with certain aspects of the present disclosure.

Various aspects are now described with reference to the drawings. In the following description, for purposes of explanation, numerous specific details are set forth in order to provide a thorough understanding of one or more aspects. It will be recognized, however, that such aspect(s) may be practiced without these specific details.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, an eNodeB (eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA 2000, etc. UTRA includes Wideband-CDMA (W-CDMA) and time division synchronous code division multiple access (TD-SCDMA). CDMA2000 covers IS-2000, IS-95 and IS-856 standards. A TDMA network may implement a radio technology such as Global System for Mobile Communications (GSM).

An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a recent release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, may have similar performance and essentially the same overall complexity as those of OFDMA system. SC-FDMA signal has lower peak-to-average power ratio (PAPR) because of its inherent single carrier structure. SC-FDMA may be used in uplink communications where lower PAPR benefits the mobile terminal in terms of transmit power efficiency.

Referring to FIG. 1, a wireless communication system 100 according to one aspect of the present disclosure is illustrated. An access point 102 (AP) includes multiple antenna groups, one including 104 and 106, another including 108 and 110, and an additional one including 112 and 114 for communicating with user equipment (UEs) 116, 122. Access point 102 may be a fixed station and may be referred to as a base station, Node B, an evolved Node B (eNB) or some other terminology.

UEs 116, 122 can be wireless terminals or other devices as previously indicated. As shown, each downlink or uplink data transmission between the AP 102 and UEs 116, 122 may be accompanied by a physical downlink control channel (PDCCH) carrying downlink control information (DCI). The PDCCH may be assigned to a UE explicitly, for example by dynamic scheduling, or implicitly, for example by semi-persistent scheduling or non-adaptive uplink (UL) transmissions.

A UE may attempt to decode the DCI messages that are received on the PDCCH in either UE-specific or common PDCCH search spaces. The common search space may have two possible PDCCH aggregation levels, each of which may result in different effective PDCCH coding rates. The aggregation levels may include four Control Channel Elements (CCEs) for level four and eight CCEs for level eight. Each CCE may occupy 36 resource elements. The UE-specific search space may have four possible PDCCH aggregation levels, using one, two, four or eight CCEs.

For each aggregation level in the common or UE-specific search space, there may be two or more PDCCH candidates to decode. Therefore, there may be up to four candidates for level four, and up to two candidates for level eight in the common search space, and up to six, six, two and two candidates for levels one, two, four and eight, respectively, in the UE-specific search space. While the common search space is not time-varying, the UE-specific search space may change with time based on a UE-specific Radio Network Temporary Identifier (RNTI). Within each search space (e.g., common or UE-specific), the decoding candidates may not have overlapped resources; however, the common search space and UE-specific search space may overlap.

Certain aspects of the present disclosure provide techniques for generating a downlink control information (DCI) message that may be transmitted by the access point 102 in a downlink channel such as a physical downlink control channel (PDCCH). The DCI message may support uplink enhancements, such as single user-multiple input multiple output (SU-MIMO), Clustered Discrete Fourier Transform Spread Orthogonal Frequency Division Multiplexing (DFT-S-OFDM), aperiodic sounding reference signal (SRS) triggering, multi-carrier operation, uplink Single Input Multiple Output (SIMO) and the like. In one aspect, an access point or eNB modifies DCI messages to accommodate various DL/UL operations and to reduce the number of blind decodes of the PDCCH performed by a user equipment. Size matching and other DCI formatting operations can be performed on control information in one or both of the common and UE-specific search spaces.

Figure 2:
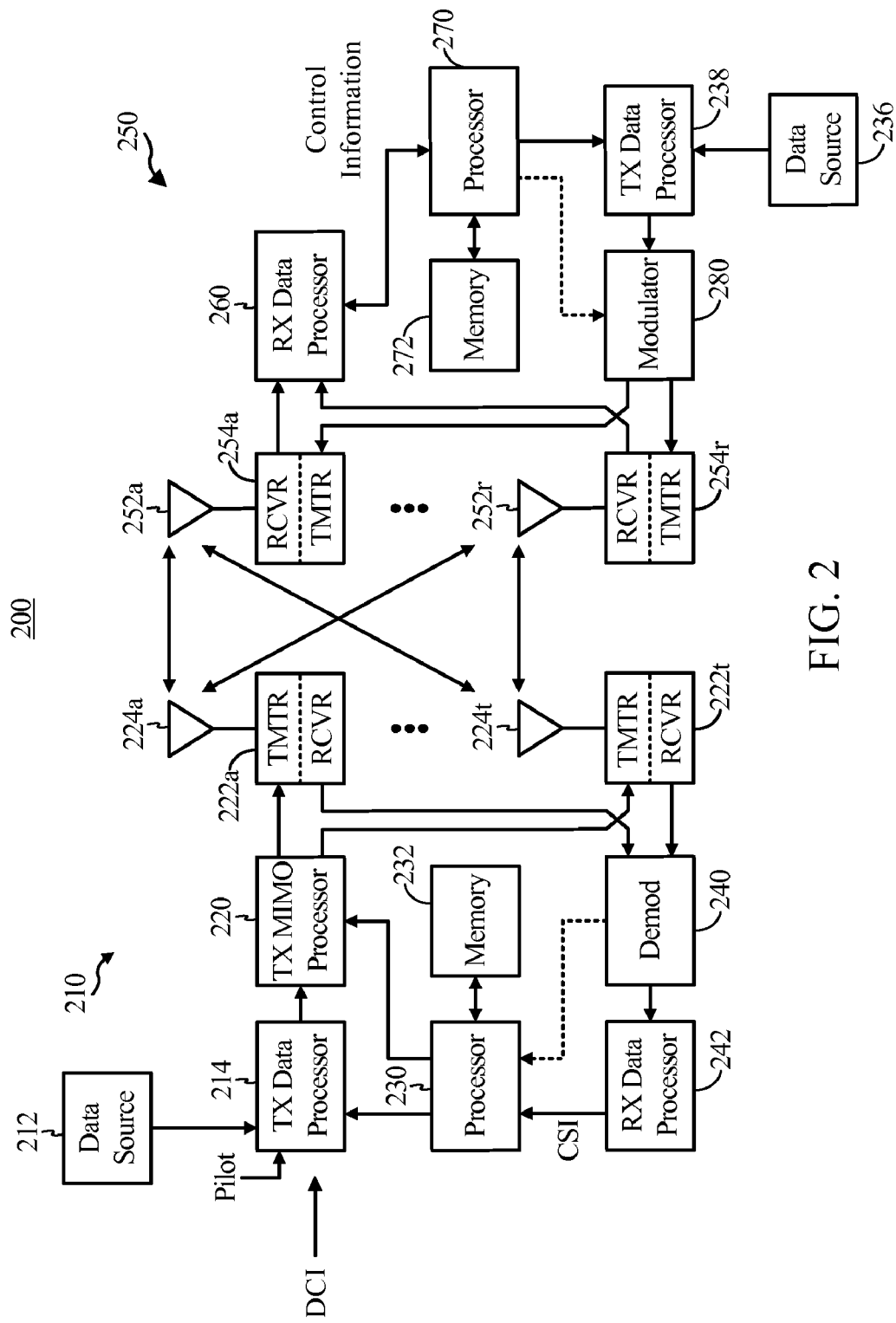
FIG. 2 illustrates aspects of a base station and access terminal, in accordance with certain aspects of the present disclosure.

FIG. 2 is a block diagram showing an aspect of a wireless communication system 200 including an exemplary base station 210 (also known as the access point) and an exemplary access terminal 250 (also known as user equipment). The base station 210 can be an access point such as access point 102 and the access terminal 250 can be a user equipment such as UE 116.

At the base station 210, traffic data for a number of data streams is provided from a data source 212 to a transmit (TX) data processor 214. In an aspect, each data stream is transmitted over a respective transmit antenna. A processor 230 may generate downlink control information (DCI) to be transmitted to the access terminal 250, for example, in a PDCCH. A TX data processor 214 formats, codes, and interleaves the traffic data for each data stream based on a particular coding scheme selected for that data stream to provide coded data. The coded data for the data streams and control information may be multiplexed with pilot data using OFDM techniques.

The pilot data is typically a known data pattern that is processed in a known manner and may be used at the receiver system to estimate the channel response. The multiplexed pilot and coded data for each data stream is then modulated (e.g., symbol mapped) based on a particular modulation scheme (e.g., Binary Phase Shift Keying (BPSK), Quadrature Phase Shift Keying (QPSK), M-PSK in which M is a power of two, or M-QAM (Quadrature Amplitude Modulation)) selected for that data stream to provide modulation symbols. The data rate, coding and modulation for each data stream may be determined by instructions performed by processor 230 that may be coupled with a memory 232.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects, TX MIMO processor 220 applies beamforming weights to the symbols of the data streams and to the antenna from which the symbol is being transmitted.

Transmitters 222 receive and process a respective symbol stream to provide one or more analog signals, and further condition (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At the access terminal 250, the transmitted modulated signals for the downlink signal are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves and decodes each detected symbol stream to recover the traffic data and control information, including DCI messages transmitted by the base station 210 in a PDCCH, for the data stream.

The processing by RX data processor 260 may complementary to that performed by TX MIMO processor 220 and TX data processor 214 at base station 210. A processor 270, coupled to a memory 272, can generate an uplink message for transmission on a physical uplink control channel (PDCCH) or a physical uplink shared channel (PDSCH) in response to the traffic data and control information.

The uplink link message may comprise various types of information regarding the communication link and/or the received data stream. The uplink message is processed by a TX data processor 238, which also receives traffic data for a number of data streams from a data source 236, modulated by a modulator 280, conditioned by transmitters 254a through 254r, and transmitted back to base station 210.

At base station 210, the modulated signals from the access terminal 250 are received by antennas 224, conditioned by receivers 222, demodulated by a demodulator 240 and processed by a RX data processor 242 to extract the uplink message transmitted by the receiver system 250. According to certain aspects, the uplink message may be transmitted in accordance with uplink control information (UCI) transmitted in the PDCCH.

Support for new uplink operations such as clustered resource allocation, aperiodic SRS triggering and the like, may require a new DCI message. For certain aspects, a size of the DCI message may be determined based on the requirements of the new uplink operation. In one aspect, the size of the DCI message may be similar to the size of DCI formats 0 and 1A in Rel-8 of the LTE standard, which are decodable by a legacy user equipment.

Figure 3:
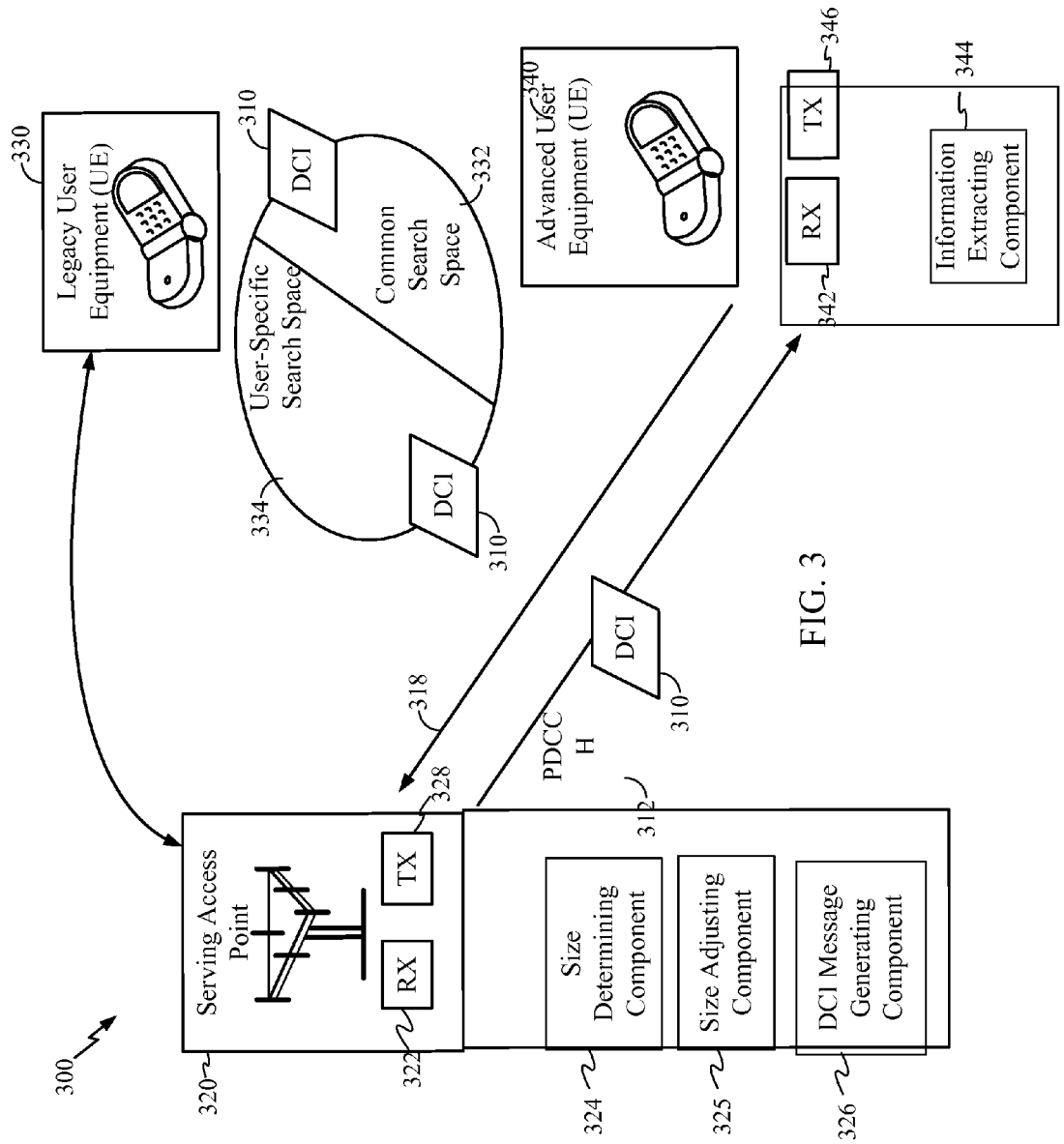
FIG. 3 illustrates a wireless communication system, in accordance with certain aspects of the present disclosure.

FIG. 3 illustrates a wireless communication system 300 which provides a downlink control channel for transmitting one or more control information messages in various formats, in accordance with certain aspects of the present disclosure. As illustrated, the communication system 300 includes a serving AP 320 that communicates with a legacy UE 330 and an advanced (non-legacy) UE 340. The legacy UE 330 may communicate, for example, in accordance with LTE Release 8 (or an earlier release), while the advanced UE 340 may communicate, for example, with LTE Release 9 (or a later release). As provided herein, control information generated by serving access point 320 may allow for backwards compatibility, allowing legacy and non-legacy UEs to co-exist in the communication system.

The serving AP 320 may transmit downlink control information to the UEs 330, 340 using one or more formats. The AP may utilize a first or a second format that may be decodable by the legacy UE 330. The AP may also use a third format for DCI messages that are decodable by the advanced UE 340 for uplink operations using SU-MIMO, DFT-S-OFDM, aperiodic SRS triggering, and the like.

The serving AP 320 may have a size determining component 324 for determining sizes of the first and the second DCI formats. The size determining component may also determine size of the third DCI format based on the requirements of the uplink operation. The size adjusting component 325 may adjust size of the second DCI format to the size of the third DCI format to generate a fourth DCI format. The DCI message generating component 326 may generate a Downlink Control Information (DCI) 310 message using one of the above formats. A transmitter 328 is operative to transmit the DCI message 310 to the UEs 330, 340. The DCI message 310 may be transmitted in either common search space 332 or UE-specific search space 334 of a physical downlink control channel (PDCCH).

At the UE 340, a receiver 342 may receive the DCI message 310. An information extracting component 344 may extract information in the DCI message. A transmitter 346 may transmit an uplink signal utilizing the extracted information. As an example, the uplink signal may utilize clustered uplink resource allocation and operation with Single Input Multiple Output (SIMO) based on the DCI message. As another example, the uplink signal may include aperiodic sounding reference signal (SRS) in response to a trigger in the DCI message.

At the AP 320, a receiver 322 receives the transmission in the uplink channel (e.g., Physical Uplink Shared Channel (PUSCH), Physical Uplink Control Channel (PUCCH), etc.) 318.

Figure 4:
FIG. 4 illustrates a table with an example organization of a physical downlink control channel (PDCCH).

FIG. 4 illustrates a table 400 showing organization of the PDCCH in Rel-8 of the LTE standard. As illustrated, for broadcast services such as system information, paging or access response, two DCI formats may be supported (such as DCI formats 1A and 1C). The DCI formats 1A and 1C may be carried in the common search space and designated by special RNTIs such as system information (SI)-RNTI, paging (P)-RNTI, random access (RA)-RNTI, and so on. The example DCI formats of FIG. 4 may be utilized in connection with communications system 300, for example, when communicating with legacy UEs 330 via operation of the DCI message generating component 326 of AP 320.

Group power control commands may also be carried in the common search space, using either DCI format 3 or 3A and designated by special purpose RNTIs such as TPC-PUCCH-RNTI or TPC-PUSCH-RNTI, wherein TPC refers to Transmit Power Control and PUCCH refers to Physical Uplink Control Channel and PUSCH refers to the Physical Uplink Shared Channel. These two formats may have sizes similar to the sizes of DCI formats 0 and 1A.

Each UE may be configured via higher layers (e.g., Radio Link Control (RLC) layer) for one of several downlink (DL) transmission modes, such as transmit diversity, open-loop spatial multiplexing, closed-loop spatial multiplexing or beamforming in a semi-static manner. Each DL transmission mode may be associated with two DL DCI formats of different sizes, one of which may be DCI format 1A, and the other may be mode-dependent such as DCI formats 1, 1B, 1D, 2, 2A or 2B. A unicast downlink transmission may be in the UE-specific search space using two DCI formats. The unicast transmission may also be in the common search space with DCI format 1A via UE-specific RNTIs such as a Cell Radio Network Temporary Identifier (C-RNTI), Semi-Persistent Scheduling (SPS), temporary RNTIs, and so on.

For uplink transmissions, only one DCI format (e.g., format 0) is supported in LTE Rel-8, which may have the same size as DCI format 1A possibly via zero-padding. A single bit in DCI format 1A and DCI format 0 may serve to differentiate these two PDCCH formats. By enforcing the same size between DCI format 0 and DCI format 1A, the total number of blind detections per PDCCH candidate may be reduced. Uplink unicast traffic may be in the UE-specific search space and the common search space via UE-specific RNTIs such as C-RNTI, SPS C-RNTI, Temporary C-RNTIs and so on. Therefore, total number of blind decoding operations $N_{bd}$ may be determined as follows:

$$N_{bd}=N_{DCI} \times (A_{UE}+A_C)=2\times(((6+6+2+2)+(4+2))=44$$

Where $N_{DCI}$ represents the number of DCI sizes, $A_{UE}$ represents the number of aggregation levels in the UE-specific search space, and $A_C$ represents the number of aggregation levels in the common search space.

New generations of devices may support enhanced features such as single user-multiple input multiple output (SU-MIMO), Clustered-DFT-S-OFDM (Discrete Fourier Transform Spread Orthogonal Frequency Division Multiplexing), and so on. For UL SU-MIMO, up to two transport blocks may be transmitted from a scheduled UE in a subframe per uplink component carrier. Each transport block may have its own modulation and coding scheme (MCS) level. In order to support enhanced UL features, new DCI formats may result in small increase in the maximum number of blind decodes.

Figure 5:
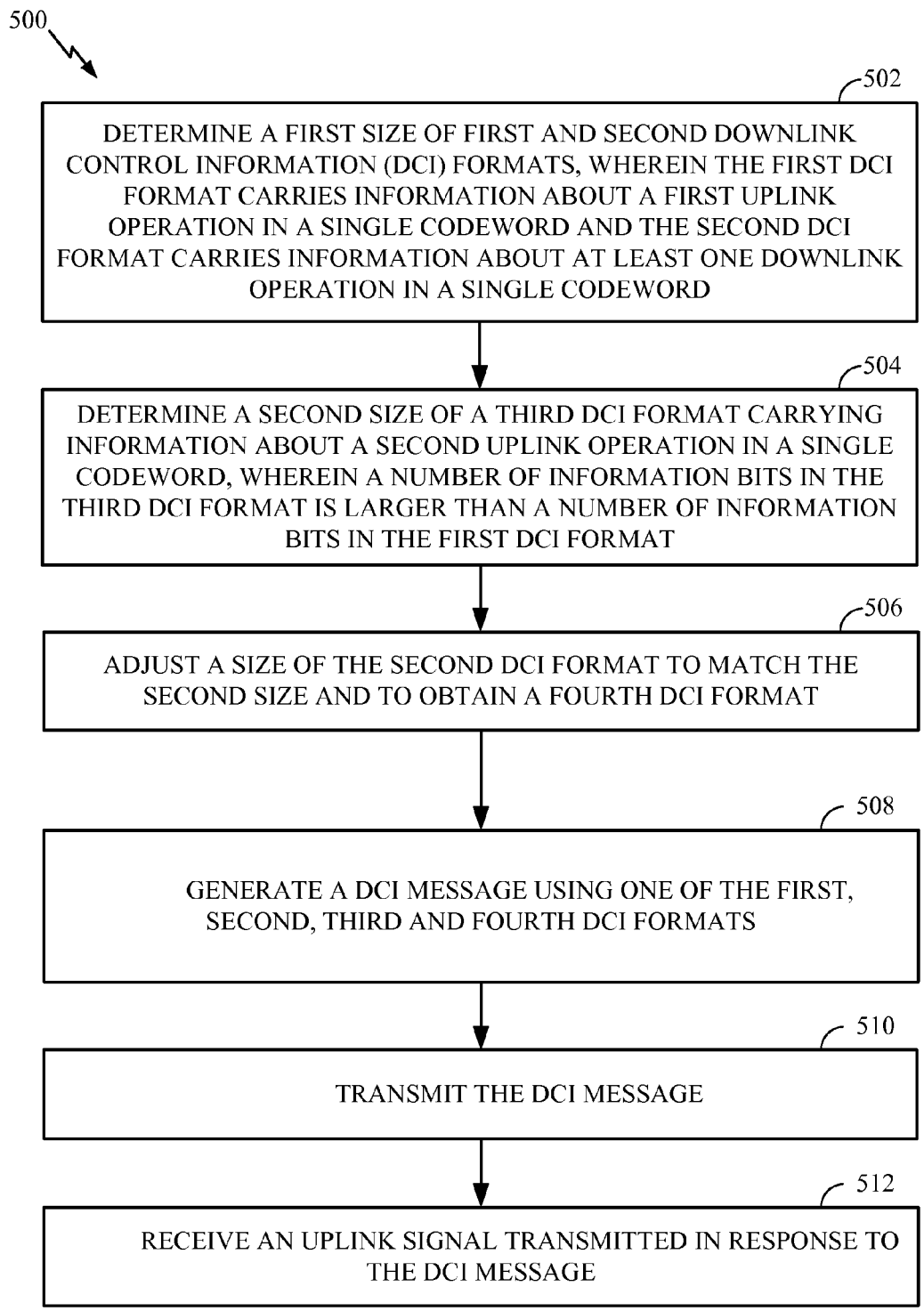
FIG. 5 illustrates example operations that may be performed by an access point for efficient encoding of a message transmitted in a downlink control channel, in accordance with certain aspects of the present disclosure.

FIG. 5 illustrates example operations 500 that may be performed by an access point for efficient generation of a message transmitted in a downlink control channel, in accordance with certain aspects of the present disclosure. The access point may be as described in connection with any of FIGS. 1-3. For instance, exemplary operations 500 may be directed by one or more processors (such as processor 230), or by one or more components (such as components 324-326).

At 502, the AP determines a first size of first and second downlink control information (DCI) formats, wherein the first DCI format carries information about a first uplink operation in a single codeword and the second DCI format carries information about at least one downlink operation in a single codeword. As an example, the first DCI format may be format 0 and the second DCI format may be format 1A in the long term evolution (LTE) standard.

At 504, the AP determines a second size of a third DCI format carrying information about a second uplink operation in a single codeword. For example, the second uplink operation may be clustered uplink resource allocation operation. Also, number of information bits in the third DCI format may be larger than number of information bits in the first DCI format. The third DCI format may carry information about both the first and the second uplink operations in a single codeword. For certain aspects, the first size may exist in at least one of common and UE-specific search spaces and the second size may only exist in a UE-specific search space.

At 506, the AP adjusts a size of the second DCI format to match the second size and to obtain a fourth DCI format. For example, the adjustment may be performed by adding one or more zero bits to the second DCI format. At 508, the AP generates a DCI message using one of the first, second, third and fourth DCI formats. At 510, the AP transmits the DCI message. At 512, the AP receives an uplink signal transmitted in response to the DCI message.

Figure 6:
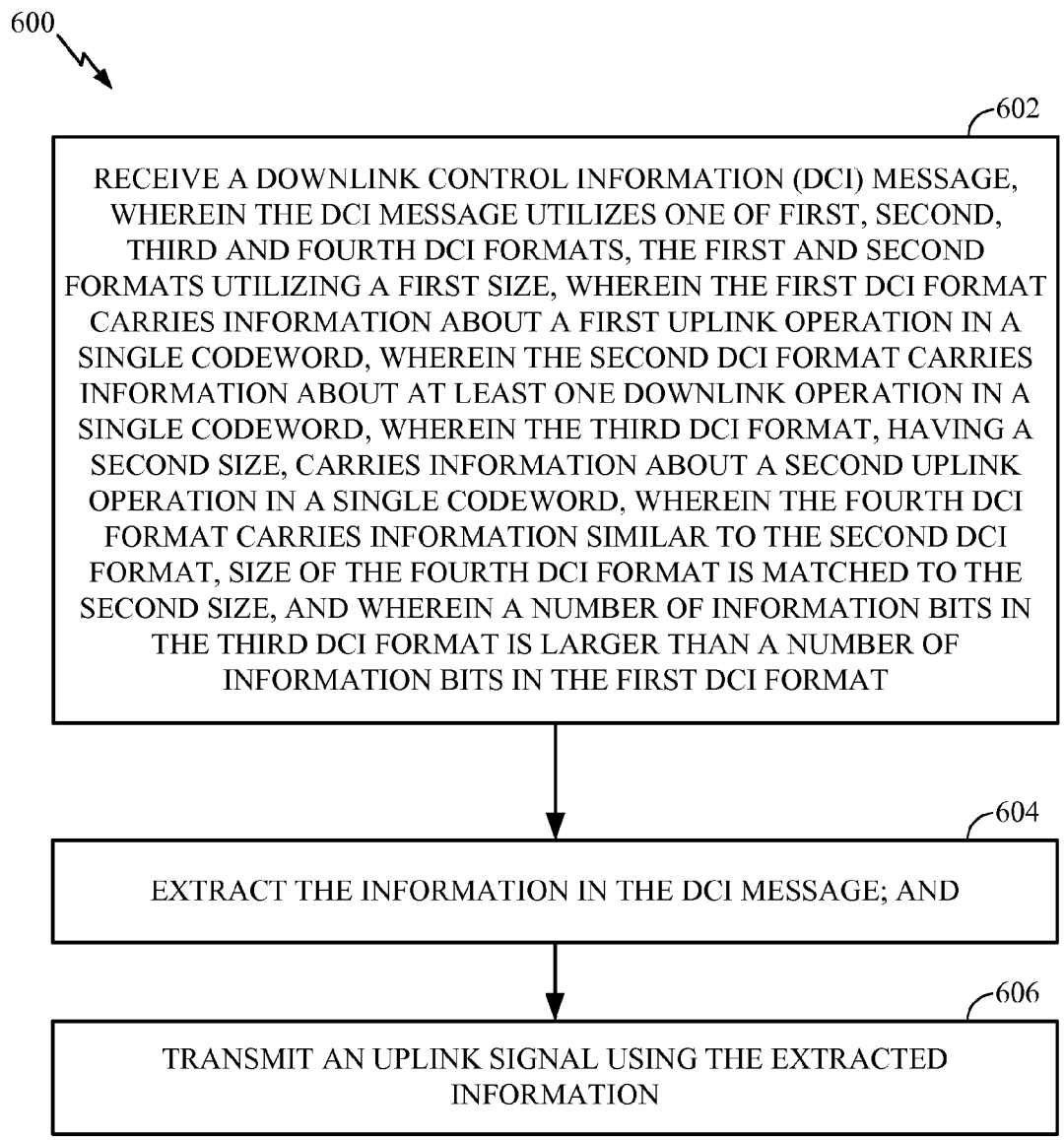
FIG. 6 illustrates example operations that may be performed by a user equipment for efficient decoding of a message received in a downlink control channel, in accordance with certain aspects of the present disclosure.

FIG. 6 illustrates example operations 600 that may be performed by a user equipment for efficient decoding of a message received in a downlink control channel, in accordance with certain aspects of the present disclosure. The user equipment may be as described in connection with any of FIGS. 1-3. For instance, exemplary operations 600 may be directed by one or more processors (such as processor 270), or by one or more components (such as components 342-346).

At 602, the UE receives a downlink control information (DCI) message, wherein the DCI message utilizes one of first, second, third, and fourth DCI formats with the first and second formats utilizing a first size. As indicated, the first DCI format may carry information about a first uplink operation in a single codeword and the second DCI format may carry information about at least one downlink operation in a single codeword. Also, the third DCI format (having the second size), may carry information about a second uplink operation in a single codeword and the fourth DCI format ma carry information similar to the second DCI format. The size of the fourth DCI format can be matched to the second size, and number of information bits in the third DCI format may be larger than number of information bits in the first DCI format. At 604, the UE extracts the information in the DCI message. At 606, the UE transmits an uplink signal using the extracted information.

Aspects of the present disclosure provide new DCI formats and organization of the downlink control channel that may be utilized in connection with communication system 300. DCI messages of these formats may be generated at an AP, for example, by DCI Message Generating Component 326. A UE, such as Advanced UE 340 may be able to decode DCI messages of these new formats, for example, using Information Extraction Component 344, to take advantage of advanced features of current and future standards releases.

Certain aspects of the present disclosure propose a new DCI format to support new uplink operations. Clustered uplink resource allocation under single input multiple output (SIMO) operation is used as an example. However, the present disclosure is not limited to this example. For purposes of explanation, the new format may be referred to as 'DCI Format 4'.

In order to keep complexity of the blind detection low, size of the DCI format 4 may be similar to the size of DCI formats 0 and 1A. In one aspect, the information fields in DCI format 0, which currently support contiguous resource allocation for single-carrier waveform, may be re-purposed by the AP and re-interpreted by the UE to support clustered UL SIMO.

In an exemplary aspect, the hopping flag in DCI format 0 may be used to indicate whether the format includes a contiguous assignment with hopping or a contiguous/clustered assignment without hopping. For example, the hopping flag equal to zero may signal that a contiguous assignment with hopping is enabled. A hopping flag equal to one may signal that a contiguous assignment without hopping is enabled if there is only one cluster. When the hopping flag is equal to one, it may also mean a clustered assignment without hopping is enabled if there are two or more clusters. The continuous/clustered assignment without hoping may jointly be included in the resource indication value field.

FIG. 7 illustrates a table 700 comprising an exemplary organization of a PDCCH using a new DCI format (e.g., DCI format 4), in accordance with one aspect of the present disclosure. As illustrated, the new DCI format may be used in both common search space and the UE-specific search space. A size of new DCI format may be matched to the size of DCI formats 0/1A such that the three formats and their corresponding UL or DL operations are carried in a same sized message.

In this aspect, a size of the new DCI format 4 may be determined based on the requirements for new uplink operations. In order to reduce blind decoding by the user equipment, the access point may size-match DCI formats 1A and 0 to a size of the new DCI format 4. In other words, a size of the new DCI format determines a size of other DCI messages. This can avoid certain limitations when compared with size-matching towards the original DCI formats 1A and 0, since the size of original DCI formats 1A and 0 may be too small for certain of the new uplink operations. The new DCI formats that are generated based on the formats 0 and 1A may be called formats 0' and 1A', respectively.

FIG. 8 illustrates a table 800 comprising another exemplary organization of a PDCCH in accordance with certain aspects of the present disclosure. In this example, to maintain backward compatibility, DCI format 1A may be used for broadcast in the common search space, while new DCI formats 1A'/0' may be used for unicast traffic, after size-matching with the DCI format 4. This exemplary organization may produce a small increase in the number of blind decoding operations when three distinct sizes for the DCI formats are present in the common search space.

FIG. 9 illustrates a table 900 comprising a further exemplary organization of a PDCCH in accordance with certain aspects of the present disclosure. As illustrated, new DCI format 4 may replace other DCI formats, including DCI format 0, which deliver uplink control information. The DCI format 4 may include all the information currently covered by the DCI format 0, in addition to the extra information needed for the new uplink operation. With this exemplary organization, the number of blind decoding operations may also increase slightly. However, the false alarm probability associated with blind decoding may not increase, since only the formats 1A'/0'/4 are utilized in the common search space for unicast transmissions.

FIG. 10 illustrates a table 1000 comprising an exemplary organization of a PDCCH, in accordance with a fourth aspect of the present disclosure. In this organization, new DCI formats 1A'/0'/4 may be utilized only in the UE-specific search space. This exemplary organization avoids an increase in the number of blind decoding operations which remain at 44.

FIG. 11 illustrates a table 1100 comprising an exemplary organization of a PDCCH in accordance with a fifth aspect of the present disclosure. As illustrated, DCI formats 0 or 0' may be removed from the set of DCI formats and DCI format 4 may be the only format used for UL SIMO scheduling (which is matched in size with DCI format 1A). A similar idea may be applied to the systems shown in other figures.

Other variations to the DCI formats are possible to support uplink enhancements. For example, size of the DCI formats 3/3A may be matched with the size of DCI format 4 if DCI format 4 is carried in the common search space. Alternatively or additionally, DCI formats 0 and 1A may be removed from broadcast in the system presented in FIG. 10, and the like.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk and Blu-ray® disc where disks usually reproduce data magnetically, while discs reproduce data optically with lasers.

The various operations of methods described in FIG. 5 may be performed by any suitable means capable of performing the corresponding functions. For example, means for determining size of a DCI message may comprise any suitable type of determining component, such as the size determining component 324 of the access point 320 illustrated in FIG. 3. Means for adjusting size of a DCI message may comprise any suitable type of adjusting component, such as the size adjusting component 325 illustrated in FIG. 3. Means for generating a DCI message may comprise any suitable type of generating component, such as the DCI message generating component 326 illustrated in FIG. 3.

These components may be implemented with any suitable components, such as one or more processors, for example, such as the TX data processor 214 and/or processor 230 of the base station 210 illustrated in FIG. 2. Means for transmitting the DCI message may comprise a suitable transmitting component such as the transmitter 328 in the access point 320 illustrated in FIG. 3 and/or the transmitter TMTR 222 of the base station 210 illustrated in FIG. 2. Means for receiving an uplink signal may comprise a suitable receiving component such as the receiver 322 of the access point 320 illustrated in FIG. 3 and/or the receiver RCVR 222 of the base station 210 illustrated in FIG. 2.

The various operations of methods described in FIG. 6 may also be performed by any suitable means capable of performing the corresponding functions. For example, means for receiving a DCI message may comprise any suitable receiving component such as the receiver 342 of the UE 320 illustrated in FIG. 3 and/or the receiver RCVR 254 of the access terminal 250 illustrated in FIG. 2. Means for extracting the information in the DCI message may comprise any suitable type of extracting component, such as the information extracting component 344 of the UE 340 illustrated in FIG. 3, and/or the RX data processor 260 and processor 270 of the access terminal 250 illustrated in FIG. 2. Means for transmitting an uplink signal may comprise any suitable transmitting component, such as the transmitter 346 of the UE 340 illustrated in FIG. 3 and/or the transmitter TMTR 254 of the access terminal 250 illustrated in FIG. 2

For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
    determining a first size of first and second downlink control information (DCI) formats, wherein the first DCI format carries information about a first uplink operation in a single codeword and the second DCI format carries information about at least one downlink operation in a single codeword;
    determining a second size of a third DCI format carrying information about a second uplink operation in a single codeword, wherein a number of information bits in the third DCI format is larger than a number of information bits in the first DCI format;
    adjusting a size of the second DCI format to match the second size and to obtain a fourth DCI format;
    generating a DCI message using one of the first, second, third or fourth DCI formats; and
    transmitting the DCI message.

2. The method of claim 1, wherein the adjusting is performed by adding one or more zero bits to the second DCI format.

3. The method of claim 1, wherein the first DCI format comprises format 0 and the second DCI format comprises format 1A in the long term evolution (LTE) standard.

4. The method of claim 1, wherein the second uplink operation comprises a clustered uplink resource allocation operation.

5. The method of claim 1, wherein the third DCI format carries information about both the first and the second uplink operations in a single codeword.

6. The method of claim 1, wherein the first size only exists in a common search space and the second size only exists in a user equipment (UE)-specific search space.

7. The method of claim 1, wherein the first size exists in both common and user equipment (UE)-specific search spaces, and the second size only exists in a UE-specific search space.

8. A method for wireless communications, comprising:
    receiving a downlink control information (DCI) message, wherein the DCI message utilizes one of first, second, third or fourth DCI formats, the first and second formats utilizing a first size, wherein the first DCI format carries information about a first uplink operation in a single codeword, wherein the second DCI format carries information about at least one downlink operation in a single codeword, wherein the third DCI format, having a second size, carries information about a second uplink operation in a single codeword, wherein the fourth DCI format carries information similar to the second DCI format, size of the fourth DCI format is matched to the second size, and wherein a number of information bits in the third DCI format is larger than a number of information bits in the first DCI format;
    extracting the information in the DCI message; and
    transmitting an uplink signal using the extracted information.

9. The method of claim 8, wherein the first DCI format comprises format 0 and the second DCI format comprises format 1A in the long term evolution (LTE) standard.

10. The method of claim 8, wherein the second uplink operation comprises a clustered uplink resource allocation operation.

11. The method of claim 8, wherein the third DCI format carries information about both the first and the second uplink operations in a single codeword.

12. The method of claim 8, wherein the first size only exists in a common search space and the second size only exists in a user equipment (UE)-specific search space.

13. The method of claim 8, wherein the first size exists in both common and user equipment (UE)-specific search spaces, and the second size only exists in a UE-specific search space.

14. The method of claim 8, wherein the information in the DCI message is extracted by blind decoding.

15. An apparatus for wireless communications, comprising:
   means for determining a first size of first and second downlink control information (DCI) formats, wherein the first DCI format carries information about a first uplink operation in a single codeword and the second DCI format carries information about at least one downlink operation in a single codeword;
   means for determining a second size of a third DCI format carrying information about a second uplink operation in a single codeword, wherein a number of information bits in the third DCI format is larger than a number of information bits in the first DCI format;
   means for adjusting a size of the second DCI format to match the second size and to obtain a fourth DCI format;
   means for generating a DCI message using one of the first, second, third or fourth DCI formats; and
   means for transmitting the DCI message.

16. The apparatus of claim 15, wherein the means for adjusting comprises means for adding one or more zero bits to the second DCI format.

17. The apparatus of claim 15, wherein the first DCI format comprises format 0 and the second DCI format comprises format 1A in the long term evolution (LTE) standard.

18. The apparatus of claim 15, wherein the second uplink operation comprises a clustered uplink resource allocation operation.

19. The apparatus of claim 15, wherein the third DCI format carries information about both the first and the second uplink operations in a single codeword.

20. The apparatus of claim 15, wherein the first size only exists in a common search space and the second size only exists in a user equipment (UE)-specific search space.

21. The apparatus of claim 15, wherein the first size exists in both common and user equipment (UE)-specific search spaces, and the second size only exists in a UE-specific search space.

22. An apparatus for wireless communications, comprising:
   means for receiving a downlink control information (DCI) message, wherein the DCI message utilizes one of first, second, third or fourth DCI formats, the first and second formats utilizing a first size, wherein the first DCI format carries information about a first uplink operation in a single codeword, wherein the second DCI format carries information about at least one downlink operation in a single codeword, wherein the third DCI format, having a second size, carries information about a second uplink operation in a single codeword, wherein the fourth DCI format carries information similar to the second DCI format, size of the fourth DCI format is matched to the second size, and wherein a number of information bits in the third DCI format is larger than a number of information bits in the first DCI format;
   means for extracting the information in the DCI message; and
   means for transmitting an uplink signal using the extracted information.

23. The apparatus of claim 22, wherein the first DCI format comprises format 0 and the second DCI format comprises format 1A in the long term evolution (LTE) standard.

24. The apparatus of claim 22, wherein the second uplink operation comprises a clustered uplink resource allocation operation.

25. The apparatus of claim 22, wherein the third DCI format carries information about both the first and the second uplink operations in a single codeword.

26. The apparatus of claim 22, wherein the first size only exists in a common search space and the second size only exists in a user equipment (UE)-specific search space.

27. The apparatus of claim 22, wherein the first size exists in both common and user equipment (UE)-specific search spaces, and the second size only exists in a UE-specific search space.

28. The apparatus of claim 22, wherein the information in the DCI message is extracted by blind decoding.

29. An apparatus for wireless communications, comprising:
   at least one processor configured to
      determine a first size of first and second downlink control information (DCI) formats, wherein the first DCI format carries information about a first uplink operation in a single codeword and the second DCI format carries information about at least one downlink operation in a single codeword,
      determine a second size of a third DCI format carrying information about a second uplink operation in a single codeword, wherein a number of information bits in the third DCI format is larger than a number of information bits in the first DCI format,
      adjust a size of the second DCI format to match the second size and to obtain a fourth DCI format,
      generate a DCI message using one of the first, second, third or fourth DCI formats, and
      transmit the DCI message; and
   a memory coupled to the at least one processor.

30. The apparatus of claim 29, wherein the at least one processor is further configured to add one or more zero bits to the second DCI format.

31. The apparatus of claim 29, wherein the first DCI format comprises format 0 and the second DCI format comprises format 1A in the long term evolution (LTE) standard.

32. The apparatus of claim 29, wherein the second uplink operation comprises a clustered uplink resource allocation operation.

33. The apparatus of claim 29, wherein the third DCI format carries information about both the first and the second uplink operations in a single codeword.

34. The apparatus of claim 29, wherein the first size only exists in a common search space and the second size only exists in a user equipment (UE)-specific search space.

35. The apparatus of claim 29, wherein the first size exists in both common and user equipment (UE)-specific search spaces, and the second size only exists in a UE-specific search space.

36. An apparatus for wireless communications, comprising:
   at least one processor configured to
      receive a downlink control information (DCI) message, wherein the DCI message utilizes one of first, second, third or fourth DCI formats, the first and second formats utilizing a first size, wherein the first DCI format carries information about a first uplink operation in a single codeword, wherein the second DCI format car-
ries information about at least one downlink operation in a single codeword, wherein the third DCI format, having a second size, carries information about a second uplink operation in a single codeword, wherein the fourth DCI format carries information similar to the second DCI format, size of the fourth DCI format is matched to the second size, and wherein a number of information bits in the third DCI format is larger than a number of information bits in the first DCI format, extract the information in the DCI message, and transmit an uplink signal using the extracted information; and a memory coupled to the at least one processor.

37. The apparatus of claim 36, wherein the first DCI format comprises format 0 and the second DCI format comprises format 1A in the long term evolution (LTE) standard.

38. The apparatus of claim 36, wherein the second uplink operation comprises a clustered uplink resource allocation operation.

39. The apparatus of claim 36, wherein the third DCI format carries information about both the first and the second uplink operations in a single codeword.

40. The apparatus of claim 36, wherein the first size only exists in a common search space and the second size only exists in a user equipment (UE)-specific search space.

41. The apparatus of claim 36, wherein the first size exists in both common and user equipment (UE)-specific search spaces, and the second size only exists in a UE-specific search space.

42. The apparatus of claim 36, wherein the information in the DCI message is extracted by blind decoding.

43. A computer-program product for wireless communications, comprising a non-transitory computer readable medium having instructions stored thereon, the instructions being executable by one or more processors and the instructions comprising:

instructions for determining a first size of first and second downlink control information (DCI) formats, wherein the first DCI format carries information about a first uplink operation in a single codeword and the second DCI format carries information about at least one downlink operation in a single codeword;

instructions for determining a second size of a third DCI format carrying information about a second uplink operation in a single codeword, wherein a number of information bits in the third DCI format is larger than a number of information bits in the first DCI format;

instructions for adjusting a size of the second DCI format to match the second size and to obtain a fourth DCI format;

instructions for generating a DCI message using one of the first, second, third or fourth DCI formats; and instructions for transmitting the DCI message.

44. The computer-program product of claim 43, wherein the instructions for adjusting comprises instructions for adding one or more zero bits to the second DCI format.

45. The computer-program product of claim 43, wherein the first DCI format comprises format 0 and the second DCI format comprises format 1A in the long term evolution (LTE) standard.

46. The computer-program product of claim 43, wherein the second uplink operation comprises a clustered uplink resource allocation operation.

47. The computer-program product of claim 43, wherein the third DCI format carries information about both the first and the second uplink operations in a single codeword.

48. The computer-program product of claim 43, wherein the first size only exists in a common search space and the second size only exists in a user equipment (UE)-specific search space.

49. The computer-program product of claim 43, wherein the first size exists in both common and user equipment (UE)-specific search spaces, and the second size only exists in a UE-specific search space.

50. A computer-program product for wireless communications, comprising a non-transitory computer readable medium having instructions stored thereon, the instructions being executable by one or more processors and the instructions comprising:

instructions for receiving a downlink control information (DCI) message, wherein the DCI message utilizes one of first, second, third or fourth DCI formats, the first and second formats utilizing a first size, wherein the first DCI format carries information about a first uplink operation in a single codeword, wherein the second DCI format carries information about at least one downlink operation in a single codeword, wherein the third DCI format, having a second size, carries information about a second uplink operation in a single codeword, wherein the fourth DCI format carries information similar to the second DCI format, size of the fourth DCI format is matched to the second size, and wherein a number of information bits in the third DCI format is larger than a number of information bits in the first DCI format;

instructions for extracting the information in the DCI message; and instructions for transmitting an uplink signal using the extracted information.

51. The computer-program product of claim 50, wherein the first DCI format comprises format 0 and the second DCI format comprises format 1A in the long term evolution (LTE) standard.

52. The computer-program product of claim 50, wherein the second uplink operation comprises a clustered uplink resource allocation operation.

53. The computer-program product of claim 50, wherein the third DCI format carries information about both the first and the second uplink operations in a single codeword.

54. The computer-program product of claim 50, wherein the first size only exists in a common search space and the second size only exists in a user equipment (UE)-specific search space.

55. The computer-program product of claim 50, wherein the first size exists in both common and user equipment (UE)-specific search spaces, and the second size only exists in a UE-specific search space.

56. The computer-program product of claim 50, wherein the information in the DCI message is extracted by blind decoding.

* * * * *